(12) United States Patent
Utagaki et al.

(10) Patent No.: US 7,967,907 B2
(45) Date of Patent: *Jun. 28, 2011

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 1007 days.

This patent is subject to a terminal disclaimer.

(21) Appl. No.: 11/698,285

(22) Filed: Jan. 26, 2007

(65) Prior Publication Data

US 2008/0178771 A1    Jul. 31, 2008

(51) Int. Cl.
C04B 16/02 (2006.01)
(52) U.S. Cl. .................................. 106/713; 106/737
(58) Field of Classification Search .................. 106/713, 106/737

See application file for complete search history.

(56) References Cited

U.S. PATENT DOCUMENTS

| | | | |
|---|---|---|---|
| 3,841,885 A | 10/1974 | Jakel | |
| 3,972,972 A | 8/1976 | Yano et al. | |
| 4,101,335 A * | 7/1978 | Barrable | 106/644 |
| 4,985,119 A | 1/1991 | Vinson et al. | |
| 5,188,889 A | 2/1993 | Nagatomi et al. | |
| 5,804,003 A | 9/1998 | Nishizawa | |
| 5,858,083 A | 1/1999 | Stav et al. | |
| 5,945,044 A * | 8/1999 | Kawai et al. | 264/37.29 |
| 6,001,169 A | 12/1999 | Kawai | |
| 6,138,430 A * | 10/2000 | Van Acoleyen et al. | 52/745.19 |
| 6,506,248 B1 | 1/2003 | Duselis et al. | |
| 6,572,697 B2 * | 6/2003 | Gleeson et al. | 106/705 |
| 6,605,148 B2 | 8/2003 | Shirakawa et al. | |
| 6,676,745 B2 | 1/2004 | Merkley et al. | |
| 6,872,246 B2 | 3/2005 | Merkley et al. | |
| 7,344,593 B2 | 3/2008 | Luo et al. | |
| 7,621,087 B2 | 11/2009 | Utagaki et al. | |
| 2001/0047741 A1 | 12/2001 | Gleeson et al. | |
| 2003/0205172 A1* | 11/2003 | Gleeson et al. | 106/679 |
| 2004/0168615 A1 | 9/2004 | Luo et al. | |
| 2005/0235883 A1 | 10/2005 | Merkley et al. | |
| 2006/0043627 A1 | 3/2006 | Sugita et al. | |
| 2007/0245930 A1 | 10/2007 | Utagaki et al. | |
| 2007/0277472 A1* | 12/2007 | Sinclair | 52/605 |
| 2008/0072797 A1 | 3/2008 | Utagaki et al. | |
| 2008/0148999 A1 | 6/2008 | Luo et al. | |
| 2008/0157428 A1 | 7/2008 | Utagaki et al. | |
| 2008/0203365 A1 | 8/2008 | Gleeson et al. | |

FOREIGN PATENT DOCUMENTS

| | | |
|---|---|---|
| JP | 49-45934 A | 5/1974 |
| JP | 49-45935 A | 5/1974 |
| JP | 54-99131 A | 8/1979 |
| JP | 58-110443 A | 7/1983 |
| JP | 1-242452 A | 9/1989 |
| JP | 1-320243 A | 12/1989 |
| JP | 3-97644 A | 4/1991 |
| JP | 3-257052 A | 11/1991 |
| JP | 04-042875 A | 2/1992 |
| JP | 04-114937 A | 4/1992 |
| JP | 4-160045 A | 6/1992 |
| JP | 4-187552 A | 7/1992 |
| JP | 04-193748 A | 7/1992 |
| JP | 04-295072 A | 10/1992 |
| JP | 5-124845 A | 5/1993 |
| JP | 05-229859 A | 9/1993 |
| JP | 6-32643 A | 2/1994 |
| JP | 6-56496 A | 3/1994 |
| JP | 6-321602 A | 11/1994 |
| JP | 6-329457 A | 11/1994 |
| JP | 7-117027 A | 5/1995 |
| JP | 07-291707 A | 11/1995 |
| JP | 7-291763 A | 11/1995 |
| JP | 08-040758 A | 2/1996 |
| JP | 9-87001 A | 3/1997 |
| JP | 10-231161 A | 9/1998 |
| JP | 11-322395 A | 11/1999 |
| JP | 2000-264701 A | 9/2000 |
| JP | 2001-158678 A | 6/2001 |
| JP | 2001-233653 A | 8/2001 |
| JP | 2001-287980 A | 10/2001 |
| JP | 2002-166406 A | 6/2002 |
| JP | 2003-146731 A | 5/2003 |
| JP | 2004-196601 A | 7/2004 |
| WO | WO 2006/025331 | 3/2006 |

OTHER PUBLICATIONS

JP 04305041 Nagata et al. (Oct. 28, 1992) abtract only. Abstract for U.S. Appl. No. 11/215,964 now issued.*
JP 61256956 A (Nov. 14, 1986) Nichias Corp. abstract only. Abstract in U.S. Appl. No. 11/215,964 now issued.*
U.S. Appl. No. 11/215,964, filed Apr. 13, 2006, K. Utagaki et al.
U.S. Appl. No. 11/354,241, filed Feb. 15, 2006, K. Utagaki et al.
U.S. Appl. No. 11/410,311, filed Apr. 25, 2006, K. Utagaki et al.
U.S. Appl. No. 11/431,652, filed May 11, 2006, K. Utagaki et al.

(Continued)

*Primary Examiner* — Paul Marcantoni
(74) *Attorney, Agent, or Firm* — Birch, Stewart, Kolasch & Birch, LLP

(57) ABSTRACT

The problems to be solved by the invention are to provide a fiber reinforced cement composition for obtaining a fiber reinforced cement product which is inexpensive and economical, and to provide pushing forward disposal of defective products.
Namely, the fiber reinforced cement composition comprises a hydraulic inorganic material, a siliceous material, a woody reinforcement and a finely dividing fiber reinforced cement product which is produced by said raw materials and cured in an autoclave.

21 Claims, No Drawings

OTHER PUBLICATIONS

U.S. Appl. No. 11/527,712, filed Sep. 27, 2006, K. Utagaki et al.
U.S. Appl. No. 11/527,715, filed Sep. 27, 2006, K. Utagaki et al.
Japanese Office Action issued on Jan. 12, 2010 in related JP Application No. 2004-251708.
Third Party Submission document filed on Jan. 4, 2010 in related Japanese Patent Application No. 2004-251708.
Third-Party Submission document filed on Jan. 5, 2010 in relateed Japanese Patent Application No. 2004-251706.
Third-Party Submission document filed on Jan. 5, 2010 in related Japanese Patent Application No. 2004-251707.
Third-Party Submission Notice issued on Jan. 28, 2010 in related Japanese Patent Application No. 2004-251708.
Third-Party Submission Notice issued on Jan. 29, 2010 in related Japanese Patent Application No. 2004-251706.
Third-Party Submission Notice issued on Jan. 29, 2010 in related Japanese Patent Application No. 2004-251707.

* cited by examiner

FIBER REINFORCED CEMENT COMPOSITION AND PRODUCTS AND MANUFACTURING PROCESS

CROSS-REFERENCE TO RELATED APPLICATION

PCT/JP2005/015667
U.S. patent application Ser. No. 11/215,964
U.S. patent application Ser. No. 11/354,241
U.S. patent application Ser. No. 11/410,311
U.S. patent application Ser. No. 11/431,652
U.S. patent application Ser. No. 11/527,712
U.S. patent application Ser. No. 11/527,715

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

The following description sets forth the inventor's knowledge of related art and problems therein and should not be construed as an admission of knowledge in the prior art.

Hitherto, for manufacturing process of fiber reinforced cement product, it is preferable to use wet forming manufacturing while dehydrating slurry and forming slurry which mixes water and powder material.

In an intermediate stage before becoming this fiber reinforced cement product, there is defective product by various circumstances.

In addition, a product is hit during conveyance of a product somewhere, a lack occurs and it becomes defective product.

Disposal of these defective products takes trouble very much, and a cost is needed for processing.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Under such circumstances, the problems to be solved by the invention are to provide a fiber reinforced cement composition for obtaining a fiber reinforced cement product which is inexpensive and economical, and to provide pushing forward disposal of defective products.

The present invention provides, as a means to solve the conventional problems, a fiber reinforced cement composition comprising the following raw material: a hydraulic inorganic material, a siliceous material, a woody reinforcement and a finely dividing fiber reinforced cement product which is produced by said raw materials and cured in an autoclave.

The effects of the present invention, it is possible to obtain a fiber reinforced cement product having good bending strength, dimensional stability and installing property performance such as handling property, flexibility performance, nail performance and the like, and it is inexpensive and economical.

And, it is possible to push forward disposal of defective products.

The above and/or other aspects, features and/or advantages of various embodiments will be further appreciated in view of the following description. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE INVENTION

The present invention will be explained in detail below.

At first, each of the raw materials used for the fiber reinforced cement composition is explained.

[Hydraulic Inorganic Material]

A hydraulic inorganic material refers to a material which causes a hydration reaction upon contact with water to initiate hardening and includes cement and lime.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for portland cement Type I, Type II, Type III, Type IV and Type V are included). Amongst, ordinary portland cement (according to ASTM C150, Type I, Type II or a blend thereof, and according to AASHTO (American Association of State Highway and Transportation Officials) M85, Type I) is inexpensive and is suitable for the use.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, bottom ash, blast furnace slag, steel slag and sodium silicate.

Furthermore, it is preferable to use pearlstone and/or fly ash.

Pearlstone is composed mainly of glassy substances and the siliceous content thereof is as high as about 80% by mass.

If pearlstone is divided for use, it becomes enough silica component of calcium silicate reaction.

When fly ash is used as the siliceous material, while fly ash is very inexpensive and economical, in addition, the resulting product such as an external wall board is excellent in nail performance because the shape of fly ash is spherical.

It is preferable that the fly ash contains not less than 50% by mass and not more than 70% by mass of $SiO_2$ component.

Thus, it is preferable to use fly ash of Type F of ASTM C618. (Type F is not less than 70% by mass of $SiO_2+Al_2O_3+Fe_2O_3$.)

Then, it is preferable to use two kinds of the siliceous material which is an average particle size of not less than 15 µm and not more than 50 µm and an average particle size of not less than 1 µm and not more than 15 µm.

If the average particle size of siliceous material is less than 15 µm, there is danger that the lightweight effect deteriorates, and if the average particle size of the siliceous material is more than 50 m, there is danger that the surface characteristics of product deteriorates.

And if the average particle size of siliceous material is less than 1 µm, there is danger that the installing property turns worse, and if the average particle size of the siliceous material is more than 15 µm, there is danger that the reactivity is not increased.

These siliceous material can use a just particle size, but it can be made in a predetermined particle size by mill such as roller mill and classifier such as air.

It is preferable in the present invention that the silica in the siliceous material is amorphous.

This is because a possibility of adverse effects (such as pneumoconiosis) of crystalline silica on a human body has been pointed out, just like asbestos cases.

It is possible to judge whether or not silica is crystalline by the appearance of the crystalline peaks of the crystalline silica contained in quartz, tridymite or cristobalite by an X-ray diffraction.

Namely, quartz or the like is crystalline and thus if the peaks of quartz or the like in an X-ray diffraction are observed in a siliceous material, the silica component contained in the siliceous material is crystalline rather than amorphous.

Accordingly, such a siliceous material in which the peaks observed in quartz or the like in an X-ray diffraction are not observed is used in the present invention.

Fly ash contains some amount of crystalline silica depending on the type (about 10% by mass of quartz). However, almost part of the crystalline silica contained in fly ash is converted to calcium silicate hydrates by calcium silicate reaction via curing in an autoclave and the crystalline silica almost disappears.

In addition, by finely dividing fly ash into an average particle size of not more than 15 µm, the reactivity is enhanced.

Thus, a major part of the trace amount of crystalline silica contained in the fly ash is converted to calcium silicate hydrates and crystalline silica almost disappears.

Thus, by using finely divided fly ash, it is possible to eliminate, subsequent to asbestos, a recent concern about the problem of health (such as oncogenesis) caused by crystalline silica.

Pearlstone is similar to fly ash, too.

Furthermore, for strength improvement and for specific gravity setting, the following components may be optionally added; the other material contained amorphous silica such as silica fume and glass powder as siliceous material.

[Woody Reinforcement]

Examples of the woody reinforcement include woody pulp, wood fiber bundle, wood fiber, wood flake, wood wool and wood powder.

It is essential in the present invention to use used paper which is industrial waste.

It is possible to reduce the cost by using the used paper as the woody reinforcement.

It is preferable to use used newspapers or corrugated cardboards as the used paper.

It is preferable to use such the used paper having a fiber length of not less than 0.5 mm and not more than 3.0 mm, a fiber diameter of not less than 10 µm and not more than 100 µm, and a Canadian standard freeness (hereinafter, sometimes referred to as CSF) of not more than 350 ml.

If the fiber length of the used paper is less than 0.5 mm, necessary reinforcement effect is not provided.

And if the fiber length of the used paper is more than 3.0 mm, mixing property with powder deteriorates.

And, if the fiber diameter of the used paper is less than 10 µm, necessary reinforcement effect is not provided.

If the fiber diameter of the used paper is more than 100 µm, consistency of the used paper in matrix becomes low, and reinforcement effect fades.

If CSF of the used paper is more than 350 ml, enough powder complementation in forming is not provided, whereby the resulting specific gravity of base material falls.

By adding the used paper in an appropriate amount, mixing property with powder (cement) is enhanced, thereby it is possible to obtain a fiber reinforced cement product excellent in handling property and nail performance.

Furthermore, it is preferable to use woody pulp, such as needle-leaves-tree unbleached kraft pulp (NUKP), needle-leaves-tree bleached kraft pulp (NBKP), Laubholz unbleached kraft pulp (LUKP) or Laubholz bleached kraft pulp (LBKP) with used paper, particularly, it is preferably to combine needle-leaves tree pulps such as NUKP and NBKP.

It is preferable to set the freeness of pulp, i.e. the value measured according to Canadian standard measurement (CSF), which varies depending on the degree of beating of pulps, to be not more than 500 ml.

Because using the pulp of such this freeness, the woody reinforcement exists in a cement (powder) matrix at a high density to give a fiber reinforced cement product having an excellent toughness.

For the ratio of the component, it is preferable that the amount of the used paper is not less than 1% by mass and not more than 20% by mass of the whole woody reinforcement consisting of the used paper and the NUKP and/or NBKP.

If the ratio of the used paper is less than 1% by mass of the whole woody reinforcement consisting of the used paper and the NUKP and/or NBKP, it does not contribute to reduction cost, whereas if the ratio of the used paper is more than 20% by mass of the whole woody reinforcement consisting of the used paper and the NUKP and/or NBKP, the properties of the product such as bending strength and nail performance becomes bad.

When a finely dividing fiber reinforced cement product which is cured in an autoclave to mention later is added abundantly, there is some non-reaction cement in this finely dividing product, and it contributes to hydration, hydrothermal reaction.

But, it is necessary to maintain aggregate by long fiber such as NUKP, because the finely dividing product is mainly an element of aggregate.

So, the ratio of the used paper which is short fiber is not more than 20% by mass.

A woody reinforcement having a CSF of not less than 500 ml may be added as an auxiliary material.

[Mica]

Mica contributes to improvement in the dimensional stability of a product since it usually has a lamellar structure, is not hygroscopic and is a high elastic substance having a rigidity.

For example, if a fiber reinforced cement product without mica contains 15% to 18% by mass of water at the time when it is sold, the size of the product tends to shrink as the water content thereof decreases upon natural evaporation of the internal water under environmental conditions. However, if a fiber reinforced cement product contains mica, the dimension thereof does not largely change.

The mica used in the present invention is preferably in the form of flakes having an average particle size of not less than 200 µm and not more than 700 µm, and an aspect ratio of not less than 60 and not more than 100.

Incidentally, the aspect ratio herein means the ratio of thickness relative to particle size.

[Water-Soluble Resin]

Examples of the water-soluble resin include polyvinyl alcohols, carboxymethyl cellulose, methyl cellulose, polyethylene oxides and polyvinyl ethers.

The water-soluble resin serves as a binder in the fiber reinforced cement product, enhances adhesion among the layers of the components contained in the product, and improves the bending strength, as well as freezing and fusion resistance of the product.

In addition, since the water-soluble resin has a water-retention action, it prevents the surface of the fiber reinforced cement product from drying in the course of autoclave curing and acts to uniform the water content, thereby achieving a uniform hardening-curing reaction.

A desirable water-soluble resin is a powdery polyvinyl alcohol resin having a saponification value of not less than 98% by mol.

Incidentally, the term "saponification value" means a percentage of the number of hydroxyl group relative to the total number of acetate group and hydroxyl group contained in a polyvinyl alcohol resin in a saponification reaction (a reaction to synthesize a polyvinyl alcohol resin in by replacing the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water of an aqueous slurry of raw materials at a normal temperature. Therefore, in the after-mentioned forming process, outflow of the polyvinyl alcohol resin is reduced, whereby the yield of process does not decrease, and the viscosity of the slurry is not raised, whereby the forming efficacy does not decrease.

In the green sheet prepared by forming the slurry of raw materials, the powdery polyvinyl alcohol resin comes to dissolve in the water contained in the green sheet owing to the high temperature in an autoclave curing process. Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in a final product, i.e. a fiber reinforced cement product. Thus, the product is provided with a cushioning property due to the effect of the shape of the balloon, whereby the internal stress which generates during freezing and fusion is absorbed and alleviated to enhance freezing and fusion resistance.

In addition, when a water-soluble resin is added, the water-soluble resin coats the surface of the particles of cement as a protecting colloid, which possibly affects the hydration reaction of the cement. However, when a powdery polyvinyl alcohol resin is used, a major part of the resin remains in a balloon state in the green sheet. Thus it becomes difficult to coat the cement particles with the polyvinyl alcohol resin as a protecting colloid, whereby the effect of the resin on the hydration reaction of the cement is reduced.

[Finely Dividing Fiber Reinforced Cement Product which is Cured in an Autoclave]

Application of the fiber reinforced cement composition includes fiber reinforced cement sidings, glass fiber reinforced cement boards, pulp reinforced cement boards, wood fiber reinforced cement calcium silicate boards, fiber reinforced cement calcium silicate boards, slag cement perlite boards and like, and all of these final products are referred to as fiber reinforced cement products.

These products are cured in an autoclave.

In other words, during in an autoclave curing, calcium silicate reaction happens by calcium component such as cement and silica component such as fly ash, and calcium silicate hydrate which is high strength such as tobermorite occurs.

Among these products, the finely dividing product which divided defective articles in which breaking off occurred during conveyance of products, and the finely dividing product which divided remaining products occurred at installing place becomes the finely dividing fiber reinforced cement product.

It is preferable that the average particle size of the finely dividing fiber reinforced cement products is not less than 15 μm and not more than 50 μm.

This finely dividing product contributed to hydration and hydrothermal reaction in what includes some non-reacting cement slightly, but large part of it becomes an aggregate factor because it is completed to calcium silicate reaction by being cured in an autoclave.

In other words, there is not much reactivity.

Thus, if the average particle size of the finely dividing fiber reinforced cement products is less than 15 μm, base material becomes minute and fragile, whereby the nail performance of product deteriorates.

And, if the average particle size of the finely dividing fiber reinforced cement products is more than 50 μm, the match with matrix is low, whereby the strength of product deteriorates.

At first fiber reinforced cement product is divided roughly by using striking type mill (primary dividing).

The striking type mill is mill in bombardment by striking, specifically it includes a hammer mill and an impact mill.

It is preferable that the particle size of roughly dividing fiber reinforced cement product by the striking type mill is not less than 0.5 mm and not more than 20 mm.

Next, roughly dividing product which is dividing by using the striking type mill is divided by using grinding type mill (second dividing).

The grinding type mill is mill by friction, for specifically it includes a ball mill, a roller mill, a vertical mill, bowl mill.

It is preferable that the particle size of finely dividing fiber reinforced cement product by the grinding type mill is not less than 1 μm and not more than 500 μm.

Finely dividing product (second dividing product) may be just used, furthermore, for example, the finely dividing product can be separated in the range of 15 to 50 μm by means of sieve classification and air classification.

[Other Component]

As the other components, the following components may be optionally added: mineral powders such as vermiculite, bentonite and dolomite; inorganic fibers such as wollastonite and glass fiber; organic fibers such as polypropylene fiber, acrylic fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone, succinic acid and surfactants; the finely dividing forming mat and press mat and intermediate products which is not cured in an autoclave.

Incidentally, these illustrations do not restrict the present invention.

[Raw Material Composition of the Fiber Reinforced Composition]

The fiber reinforced cement composition is preferably composed of the following raw materials: not less than 27% by mass and not more than 35% by mass of a hydraulic inorganic material, not less than 36% by mass and not more than 60% by mass of a siliceous material, not less than 6% by mass and not more than 12% by mass of a woody reinforcement.

It is preferable to add not less than 5% by mass and not more than 20% by mass of the finely dividing fiber reinforced cement product which is cured in an autoclave.

Furthermore, it is preferable to add not less than 1% by mass and not more than 7% by mass of mica, and not less than 0.25% by mass and not more than 1.25% by mass of a water-soluble resin.

If the amount of the hydraulic inorganic material is less than 27% by mass, development of the strength after first hardening is not sufficient, whereas if it is more than 35% by mass, the resulting fiber reinforced cement product becomes rigid and fragile.

If the amount of the siliceous material is less than 36% by mass, a siliceous component which reacts in calcium silicate reaction is not enough, whereas if it is more than 60% by mass, a calcium component is not enough to react an unreacted siliceous component, and the unreacted siliceous component remains.

If the amount of the woody reinforcement is less than 6% by mass, a problem with regard to toughness of the resulting fiber reinforced cement product occurs, whereas if it is more than 12% by mass, uniform dispersion thereof in the raw materials becomes difficult.

If the amount of the mica is less than 1% by mass, it does not contribute to the dimensional stability of the resulting fiber reinforced cement product, whereas if it is more than 7% by mass, uniform dispersion thereof in the raw materials becomes difficult.

If the amount of the water-soluble resin is less than 0.25% by mass, it does not contribute to the development of strength, whereas if it is more than 1.25% by mass, improvement in the physical properties of the resulting product is not achieved.

If the amount of the finely dividing fiber reinforced cement product which is cured in an autoclave is more than 20% by mass, ratio of aggregate material increases in material composition, and reactivity of the fiber reinforced cement composition decreases, and dispersion of product becomes large, and control of physical properties is difficult, whereas if it is less than 5% by mass, the disposal of defective articles is not achieved, and the fiber reinforced cement product which is low cost and economical can not be got.

[Manufacturing Prosess]

In a process for manufacturing a fiber reinforced cement product, at first, the above-mentioned composition is mixed with water to give a slurry of raw materials.

The concentration of solid content of the slurry is in a range of from 3 to 15% by mass.

The slurry of raw materials is subjected to a wet manufacturing process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for forming herein.

The "flow on process" is a process in which a slurry of raw materials is flow down on an endless felt provided with a suction unit below the felt and formed with suction-dehydration to give a green sheet (i.e. a soft wet sheet), and the green sheet is rolled up around a making roll to give a multi-layer sheet, and when the thickness of the multi-layer sheet reaches a predetermined thickness, the sheet is removed from the making roll to give a green mat.

The number of rolling around the making roll is preferably 6 to 15.

Then, the green mat is pressed with a pressure of 2 to 5 MPa.

Incidentally, the green sheet is rolled up around the making roll in layers also in Hatschek process like in flow on process. In the Hatschek process, forming speed is high, and as the speed increases, the fibers are more readily orientated and the aspect ratio (length/breadth ratio) of the bending strength increases. On the other hand, in the flow on process in which raw materials are flown down on the felt, fibers are not so readily orientated as in the Hatschek process, and thus the aspect ratio of the bending strength is not so increased as in the Hatschek process.

In addition, since plural butts each accommodating a cylinder are provided and a felt is run on the cylinders in the butts to transfer the slurry of raw materials to the felt in the Hatschek process, the green sheet which has been formed and dehydrated on the felt and rolled up around the making roll produces a laminar structure having the number of layers equivalent to the number of the butts.

On the contrary, when the flow on process is employed, the resulting green sheet itself is not laminar structure but the green mat which the green sheet is rolled up around the making roll is a laminar structure having the number of layers equivalent to the number of rolling up around the making roll, and thus the resulting sheet has s freezing and fusion resistance better than that of the green sheet obtained by Hatschek process.

Furthermore, in the Hatschek process, a felt is run on the cylinders in the butts to transfer the slurry of raw materials to the felts, and thus it is necessary to increase the number of the butt to increase the thickness of the resulting fiber reinforced cement board. This is very uneconomical. On the other hand, in the flow on process, since the thickness of the board can be increased readily by increasing the amount of the slurry of raw materials to be flown down on the felt, the flow on process is economical. In addition, the bulk of the board can be increased prior to pressing in this process, whereby deep embosses can be formed on the green mat.

Therefore, it is preferable to adopt the flow on process.

In forming of this flow on process, it makes material slurry flow down on a felt, and it is dehydrated through the felt by aspiration.

And the green sheet is formed of between making roll from a place of flow on a felt.

Subsequently, the press molded mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a siliceous component and an alumina component elute from the surface of mica, thereby roughening the surface of mica.

In addition, the calcium component eluted from cement or the like is liable to enter into the space among overlapped parts of mica fragments, and the calcium component reacts with the siliceous component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, whereby the dimensional stability of the product, as well as the freezing and fusion resistance of the product are enhanced.

If the amount of the calcium component is too much relative to the amount of the siliceous component, a cement hydration predominantly occurs rather than a calcium silicate reaction, whereby the resulting fiber reinforced cement product becomes fragile and the crack resistance thereof decreases.

On the contrary, if the amount of the siliceous component is too much relative to the amount of the calcium component, unreacted siliceous component remains in a large amount and production of tobermorite decreases, whereby the freezing and fusion resistance of the product decreases.

[Coating Method]

Coating of the fiber reinforced cement product is effected, for example, by coating with a sealer the front face twice and the ends and the rear face once, applying an undercoating such as an aqueous emulsion type acrylic resin paint or a silicone resin paint, applying as intermediate coating, and then applying a top coating such as an organic solvent solution-type coating composition of acrylic resin, an aqueous emulsion-type coating composition of acrylic resin or as an organic solvent solution-type coating composition of silicone acrylic resin.

[Installation Method]

As method for installation of the fiber reinforced cement product, it is preferable to effect, for example, in the case of fiber reinforced cement sidings, by nailing a first siding at the positions about 20 mm inside from or below the upper edge thereof, placing a second siding on the first siding in such a manner that the lower edge of the second siding overlaps the upper edge of the first siding by not less than 30 mm, and then nailing the second siding at the positions about 20 mm inside from the upper edge thereof according to a so-called lap boarding.

DESCRIPTION OF THE PREFERRED EMBODIMENTS

In the following paragraphs, some preferred embodiments of the invention will be described with reference to the attached drawing by way of example and not limitation.

It should be understood based on this disclosure that various other modifications can be made by those in the art based on these illustrated embodiments.

Embodiment 1

Examples 1 to 8 and Comparisons 1 to 8 of the present invention will be illustrated by Embodiment 1.

Table 1

Table 1 shows the compositions of the raw materials used in Examples 1 to 8 according to the present invention.

TABLE 1

| Raw material composition (% by mass) | Example 1 | Example 2 | Example 3 | Example 4 | Example 5 | Example 6 | Example 7 | Example 8 |
| --- | --- | --- | --- | --- | --- | --- | --- | --- |
| Portland cement | 30 | 30 | 30 | 30 | 30 | 30 | 30 | 30 |
| Finely dividing fly ash | 16 | 18 | 21 | 18 | 16 | 18 | 21 | 18 |
| Fly ash | 10 | 5 | 0 | 0 | 10 | 5 | 0 | 0 |
| Finely dividing pearlstone | 15 | 18 | 20 | 18 | 15 | 18 | 20 | 18 |
| Expanded perlite | 10 | 5 | 0 | 0 | 10 | 5 | 0 | 0 |
| Finely dividing fiber reinforced cement product which is cured in an autoclave | 5 | 10 | 15 | 20 | 5 | 10 | 15 | 20 |
| NUKP | 8 | 8 | 4 | 8 | 9 | 9 | 9 | 9 |
| NBKP | 0 | 0 | 4 | 0 | 0 | 0 | 0 | 0 |
| Used newspapers | 2 | 2 | 2 | 2 | 1 | 1 | 1 | 1 |
| Mica | 3 | 3 | 3 | 3 | 3 | 3 | 3 | 3 |
| Polyvinyl alcohol resin | 1 | 1 | 1 | 1 | 1 | 1 | 1 | 1 |

The raw materials having the composition shown in the table are mixed, and water is added thereto to give a slurry of raw materials having a solid concentration of 10% by mass. The slurry is caused to flow down on a felt and formed with dehydration to give a green sheet. The green sheet is rolled up around a making roll to give a multilayer structure. When the thickness of the sheet reaches a predetermined value, the sheet is separated from the making roll to give a green mat. The mat is pressed with a pressure of 5 MPa, hardened and cured at 80° C. for 15 hours, and further cured in an autoclave at 170° C. for 7 hours to provide a fiber reinforced cement product.

Table 2

Table 2 shows physical properties of the products of Examples 1 to 8 according to the present invention.

Bending strength and Young's modulus are measured using a test piece of 70×200 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the test piece at 20° C. under RH of 60% for 10 days and then drying it at 80° C. for 10 days to allow moisture effusion.

Microcracking test (cycle) means the number of cycles until cracks occur, wherein one cycle consists of a water absorption-drying procedure repeated 3 times in on week, said procedure consisting of carbonation for 4 days, water absorption for 7 hours and drying at 120° C. for 17 hours.

Freezing and fusion resistance is a percentage of expansion in thickness after 300 cycles according to ASTM C166-B method.

Nailing performance is determined by observing generation of cracks when two fiber reinforced cement products which are laid to overlap with each other by 30 mm according to the lap boarding are pegged with nails of 2.3 mm in diameter and 38 mm in length by means of nailer gun at the positions of the overlapped part of the products 20 mm inside from the edges of the overlapped part in the longitudinal direction and in the shorter direction in compliance with actual installation.

TABLE 2

| Physical property | Example 1 | Example 2 | Example 3 | Example 4 | Example 5 | Example 6 | Example 7 | Example 8 |
|---|---|---|---|---|---|---|---|---|
| Absolute dry specific gravity | 1.23 | 1.24 | 1.25 | 1.24 | 1.22 | 1.23 | 1.24 | 1.23 |
| Young's modulus (kN/mm$^2$) | 5.1 | 5.3 | 5.2 | 5.3 | 5.4 | 6.1 | 6.5 | 5.8 |
| Bending strength (N/mm$^2$) | 20.1 | 20.6 | 20.2 | 20.4 | 20.7 | 21.1 | 21.3 | 20.9 |
| Elongation ratio through water absorption (%) | 0.12 | 0.11 | 0.11 | 0.11 | 0.12 | 0.12 | 0.12 | 0.12 |
| Contraction ratio through moisture effusion (%) | 0.13 | 0.12 | 0.12 | 0.12 | 0.13 | 0.13 | 0.13 | 0.13 |
| Microcracking test (cycle) | 10 | 10 | 10 | 10 | 10 | 10 | 10 | 10 |
| Freezing and fusion resistance (%) | 1.5 | 1.1 | 1.0 | 1.2 | 1.7 | 1.4 | 1.1 | 1.3 |
| Nail performance | ○ | ○ | ○ | ○ | ○ | ○ | ○ | ○ |

The mark "○" denotes no cracking and the mark "X" denotes generation of cracks.

EXAMPLE 1

The fiber reinforced cement product of Example 1, in which the amount of finely dividing fiber reinforced cement product which is cured in an autoclave is 5% by mass and the used paper is 20% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 2

The fiber reinforced cement product of Example 2, in which the amount of finely dividing fiber reinforced cement product which is cured in an autoclave is 10% by mass and the used paper is 20% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 3

The fiber reinforced cement product of Example 3, in which the amount of finely dividing fiber reinforced cement product which is cured in an autoclave is 15% by mass and the used paper is 20% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 4

The fiber reinforced cement product of Example 4, in which the amount of finely dividing fiber reinforced cement product which is cured in an autoclave is 20% by mass and the used paper is 20% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 5

The fiber reinforced cement product of Example 5, in which the amount of finely dividing fiber reinforced cement product which is cured in an autoclave is 5% by mass and the used paper is 10% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 6

The fiber reinforced cement product of Example 6, in which the amount of finely dividing fiber reinforced cement product which is cured in an autoclave is 10% by mass and the used paper is 10% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 7

The fiber reinforced cement product of Example 7, in which the amount of finely dividing fiber reinforced cement product which is cured in an autoclave is 15% by mass and the used paper is 10% by mass of the whole woody reinforcement, is excellent in physical properties such as bending strength, young's modulus, elongation ratio through water absorption, contraction ratio through moisture effusion, microcracking test, freezing and fusion resistance and nail performance.

EXAMPLE 8

The fiber reinforced cement product of Example 8, in which the amount of finely dividing fiber reinforced cement product which is cured in an autoclave is 20% by mass and the used paper is 10% by mass of the whole woody reinforcement, is excellent in physical properties such as bending strength, young's modulus, elongation ratio through water absorption, contraction ratio through moisture effusion, microcracking test, freezing and fusion resistance and nail performance.

Table 3

Table 3 shows the compositions of the raw materials of Comparisons 1 to 8 in which the fiber reinforced cement products were manufactured by a process similar to that in the examples.

Table 4

Table 4 shows various physical properties of the fiber reinforced cement products of Comparisons 1 to 8 in which the fiber reinforced cement products were measured in a manner similar to that in the examples.

Comparison 1

The fiber reinforced cement product of Comparison 1 is a blank, in which not added the finely dividing fiber reinforced cement product which is cured in an autoclave.

siderably poor in physical properties such as freezing and fusion resistance, and is poor in physical properties such as nail performance.

Comparison 5

The fiber reinforced cement product of Comparison 5, in which the amount of finely dividing fiber reinforced cement product which is cured in an autoclave is 20% by mass but the

TABLE 4

| Physical property | Comparison 1 | Comparison 2 | Comparison 3 | Comparison 4 | Comparison 5 | Comparison 6 | Comparison 7 | Comparison 8 |
|---|---|---|---|---|---|---|---|---|
| Absolute dry specific gravity | 1.22 | 1.27 | 1.24 | 1.26 | 1.30 | 1.07 | 1.11 | 1.15 |
| Young's modulus (kN/mm$^2$) | 5.3 | 4.2 | 3.8 | 3.1 | 2.8 | 3.6 | 3.1 | 2.2 |
| Bending strength (N/mm$^2$) | 20.3 | 17.5 | 16.3 | 13.0 | 11.8 | 15.9 | 13.3 | 10.6 |
| Elongation ratio through water absorption (%) | 0.12 | 0.12 | 0.13 | 0.13 | 0.13 | 0.18 | 0.17 | 0.17 |
| Contraction ratio through moisture effusion (%) | 0.13 | 0.13 | 0.14 | 0.14 | 0.14 | 0.20 | 0.19 | 0.19 |
| Microcracking test (cycle) | 10 | 8 | 7 | 5 | 4 | 10 | 10 | 7 |
| Freezing and fusion resistance (%) | 1.3 | 1.5 | 1.9 | 2.2 | 2.3 | 7.5 | 7.7 | 6.9 |
| Nail performance | ○ | X | X | X | X | ○ | ○ | X |

TABLE 3

| Raw material composition (% by mass) | Comparison 1 | Comparison 2 | Comparison 3 | Comparison 4 | Comparison 5 | Comparison 6 | Comparison 7 | Comparison 8 |
|---|---|---|---|---|---|---|---|---|
| Portland Cement | 30 | 30 | 30 | 30 | 30 | 30 | 30 | 30 |
| Finely dividing fly ash | 18 | 16 | 11 | 18 | 18 | 16 | 16 | 16 |
| Fly ash | 10 | 0 | 0 | 0 | 0 | 0 | 0 | 0 |
| Finely dividing pearlstone | 18 | 15 | 10 | 18 | 18 | 15 | 0 | 0 |
| Expanded perlite | 10 | 0 | 0 | 0 | 0 | 0 | 0 | 0 |
| Finely dividing fiber reinforced cement product which is cured in an autoclave | 0 | 25 | 35 | 20 | 20 | 20 | 35 | 35 |
| NUKP | 8 | 8 | 4 | 5 | 0 | 12 | 12 | 0 |
| NBKP | 0 | 0 | 4 | 0 | 0 | 0 | 0 | 0 |
| Used newspapers | 2 | 2 | 2 | 5 | 10 | 3 | 3 | 15 |
| Mica | 3 | 3 | 3 | 3 | 3 | 3 | 3 | 3 |
| Polyvinyl alcohol resin | 1 | 1 | 1 | 1 | 1 | 1 | 1 | 1 |

Examples 1 to 8 show the value that does not have inferiority in comparison with this blank.

Comparison 2

The fiber reinforced cement product of Comparison 2, in which the amount of finely dividing fiber reinforced cement product which is cured in an autoclave is 25% by mass, is slightly poor in physical properties such as bending strength, young's modulus, microcracking test and freezing and fusion resistance, and is poor in physical properties such as nail performance.

Comparison 3

The fiber reinforced cement product of Comparison 3, in which the amount of finely dividing fiber reinforced cement product which is cured in an autoclave is 35% by mass, is considerably poor in physical properties such as bending strength, young's modulus, and is slightly poor in physical properties such as microcracking test, freezing and fusion resistance, and is poor in physical properties such as nail performance.

Comparison 4

The fiber reinforced cement product of Comparison 4, in which the amount of finely dividing fiber reinforced cement product which is cured in an autoclave is 20% by mass but the used paper is 50% by mass of the whole woody reinforcement, is very poor in physical properties such as bending strength, young's modulus, microcracking test, and is conwoody reinforcement is only the used paper, is very poor in physical properties such as bending strength, young's modulus, microcracking test, and is considerably poor in physical properties such as freezing and fusion resistance, and is poor in physical properties such as nail performance.

Comparison 6

The fiber reinforced cement product of Comparison 6, in which the amount of finely dividing fiber reinforced cement product which is cured in an autoclave is 20% by mass but the whole woody reinforcement is 15% by mass, has very low absolute dry specific gravity, and is considerably poor in physical properties such as bending strength, young's modulus, elongation ratio through water absorption, contraction ratio through moisture effusion, and is very poor in physical properties such as freezing and fusion resistance.

Comparison 7

The fiber reinforced cement product of Comparison 7, in which the amount of finely dividing fiber reinforced cement product which is cured in an autoclave is 35% by mass and the whole woody reinforcement is 15% by mass, has considerably low absolute dry specific gravity, and is considerably poor in physical properties such as bending strength, young's modulus, elongation ratio through water absorption, contraction ratio through moisture effusion, and is very poor in physical properties such as freezing and fusion resistance.

Comparison 8

The fiber reinforced cement product of Comparison 8, in which the amount of finely dividing fiber reinforced cement product which is cured in an autoclave is 35% by mass and the whole woody reinforcement which is only the used paper is 15% by mass, has considerably low absolute dry specific gravity, and is very poor in physical properties such as bending strength, young's modulus, and is considerably poor in physical properties such as elongation ratio through water absorption, contraction ratio through moisture effusion, and is slightly poor in physical properties such as microcracking test, and is very poor in physical properties such as freezing and fusion resistance, and is poor in physical properties such as nail performance.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.q., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferable" is non-exclusive and means "preferable, but not limited to".

In this disclosure and during the prosecution of this application, the terminology "present invention" or "invention" is meant as non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A fiber reinforced cement composition comprising the following raw materials:
   a hydraulic inorganic material;
   a siliceous material;
   a woody reinforcement;
   fiber reinforced cement particles having average particle size of 15-50 μm;
   mica; and
   polyvinyl alcohol resin, wherein
   the amount of the woody reinforcement is not less than 6% by mass and not more than 12% by mass;
   the woody reinforcement comprises needle-leaves-tree unbleached kraft pulp and/or needle-leaves-tree bleached kraft pulp and used newspaper,
   the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp,
   the amount of the fiber reinforced cement particles is not less than 5% by mass and not more than 20% by mass, and
   the fiber reinforced cement particles are obtained by grinding and/or milling a fiber reinforced cement product which is obtained by curing raw materials comprising a hydraulic inorganic material, a siliceous material and a woody reinforcement in an autoclave.

2. The fiber reinforced cement composition according to claim 1, wherein
   the hydraulic inorganic material is Portland cement, and
   the siliceous material is pearlstone and/or fly ash.

3. A fiber reinforced cement composition comprising the following raw materials:
   not less than 27% by mass and not more than 35% by mass of a hydraulic inorganic material;
   not less than 36% by mass and not more than 60% by mass of a siliceous material;
   not less than 6% by mass and not more than 12% by mass of a woody reinforcement;
   not less than 5% by mass and not more than 20% by mass of fiber reinforced cement particles having average particle size of 15-50 μm;
   not less than 1% by mass and not more than 7% by mass of mica;
   not less than 0.25% by mass and not more than 1.25% by mass of a polyvinyl alcohol resin, wherein
   the woody reinforcement comprises needle-leaves-tree unbleached kraft pulp and/or needle-leaves-tree bleached kraft pulp and used newspaper,
   the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp, and
   the fiber reinforced cement particles are obtained by grinding and/or milling a fiber reinforced cement product which is obtained by curing raw materials comprising a hydraulic inorganic material, a siliceous material and a woody reinforcement in an autoclave.

4. The fiber reinforced cement composition according to claim 3, wherein
   the hydraulic inorganic material is Portland cement, and
   the siliceous material is pearlstone and/or fly ash.

5. A fiber reinforced cement product comprising the following raw materials:
   not less than 27% by mass and not more than 35% by mass of a hydraulic inorganic material;
   not less than 36% by mass and not more than 60% by mass of a siliceous material;
   not less than 6% by mass and not more than 12% by mass of a woody reinforcement;
   not less than 5% by mass and not more than 20% by mass of fiber reinforced cement particles having average particle size of 15-50 μm;
   not less than 1% by mass and not more than 7% by mass of mica; and
   not less than 0.25% by mass and not more than 1.25% by mass of a polyvinyl alcohol resin, wherein
   the woody reinforcement comprises needle-leaves-tree unbleached kraft pulp and/or needle-leaves-tree bleached kraft pulp and used newspaper,
   the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp, and the fiber reinforced cement particles are obtained by grinding and/or milling a fiber reinforced cement product which is obtained by curing raw materials comprising a hydraulic inorganic material, a siliceous material and a woody reinforcement in an autoclave.

6. The fiber reinforced cement product according to claim 5, wherein
the hydraulic inorganic material is Portland cement, and
the siliceous material is pearlstone and/or fly ash.

7. The fiber reinforced cement composition according to claim 1, wherein the polyvinyl alcohol resin is a powdery polyvinyl alcohol resin having a saponification value 98 mol % or higher.

8. The fiber reinforced cement composition according to claim 7, wherein
the amount of the hydraulic inorganic material is not less than 27% by mass and not more than 35% by mass;
the amount of siliceous material is not less than 36% by mass and not more than 60% by mass; and
the amount of mica is not less than 1% by mass and not more than 7% by mass of mica.

9. The fiber reinforced cement composition according to claim 7, wherein
the hydraulic inorganic material is Portland cement, and
the siliceous material is pearlstone and/or fly ash.

10. A fiber reinforced cement product comprising the following raw materials:
a hydraulic inorganic material;
a siliceous material;
a woody reinforcement;
fiber reinforced cement particles having average particle size of 15-50 μm;
mica; and
polyvinyl alcohol resin, wherein
the amount of the woody reinforcement is not less than 6% by mass and not more than 12% by mass;
the woody reinforcement comprises needle-leaves-tree unbleached kraft pulp and/or needle-leaves-tree bleached kraft pulp and used newspaper,
the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp,
the amount of the fiber reinforced cement particles is not less than 5% by mass and not more than 20% by mass, and
the fiber reinforced cement particles are obtained by grinding and/or milling a fiber reinforced cement product which is obtained by curing raw materials comprising a hydraulic inorganic material, a siliceous material and a woody reinforcement in an autoclave.

11. The fiber reinforced cement product according to claim 10, wherein
the hydraulic inorganic material is Portland cement, and
the siliceous material is pearlstone and/or fly ash.

12. The fiber reinforced cement product according to claim 10, wherein the polyvinyl alcohol resin is a powdery polyvinyl alcohol resin having a saponification value of 98 mol % or higher.

13. The fiber reinforced cement product according to claim 12, wherein
the amount of the hydraulic inorganic material is not less than 27% by mass and not more than 35% by mass;
the amount of siliceous material is not less than 36% by mass and not more than 60% by mass; and
the amount of mica is not less than 1% by mass and not more than 7% by mass of mica.

14. The fiber reinforced cement product according to claim 12, wherein
the hydraulic inorganic material is Portland cement, and
the siliceous material is pearlstone and/or fly ash.

15. A process for manufacturing a fiber reinforced cement product which comprises the following steps:
preparing a slurry by dispersing in water a mixture of the following raw materials:
a hydraulic inorganic material;
a siliceous material;
a woody reinforcement;
fiber reinforced cement particles having average particle size of 15-50 μm;
mica; and
polyvinyl alcohol resin, wherein
the amount of a woody reinforcement is not less than 6% by mass and not more than 12% by mass,
the woody reinforcement comprises needle-leaves-tree unbleached kraft pulp and/or needle-leaves-tree bleached kraft pulp and used newspaper,
the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp,
the amount of the fiber reinforced cement particles is not less than 5% by mass and not more than 20% by mass, and
the fiber reinforced cement particles are obtained by grinding and/or milling a fiber reinforced cement product which is obtained by curing raw materials comprising a hydraulic inorganic material, a siliceous material and a woody reinforcement in an autoclave;
forming a green mat by forming the slurry;
press-molding the green mat; and
curing the press mat in an autoclave.

16. The process for manufacturing the fiber reinforced cement product according to claim 15, wherein
the hydraulic inorganic material is Portland cement, and
the siliceous material is pearlstone and/or fly ash.

17. The process for manufacturing the fiber reinforced cement product according to claim 15, wherein the polyvinyl alcohol resin is a powdery polyvinyl alcohol resin having a saponification value of 98 mol % or higher.

18. The process for manufacturing the fiber reinforced cement product according to claim 17, wherein
the amount of the hydraulic inorganic material is not less than 27% by mass and not more than 35% by mass;
the amount of siliceous material is not less than 36% by mass and not more than 60% by mass; and
the amount of mica is not less than 1% by mass and not more than 7% by mass of mica.

19. The process for manufacturing the fiber reinforced cement product according to claim 17, wherein
the hydraulic inorganic material is Portland cement, and
the siliceous material is pearlstone and/or fly ash.

20. A process for manufacturing a fiber reinforced cement product which comprises the following steps:
preparing a slurry by dispersing in water a mixture of following raw materials:
not less than 27% by mass and not more than 35% by mass of a hydraulic inorganic material;

not less than 36% by mass and not more than 60% by mass of a siliceous material;
not less than 6% by mass and not more than 12% by mass of a woody reinforcement;
not less than 5% by mass and not more than 20% by mass of fiber reinforced cement particles having average particle size of 15-50 μm;
not less than 1% by mass and not more than 7% by mass of mica; and
not less than 0.25% by mass and not more than 1.25% by mass of a polyvinyl alcohol resin, wherein
the woody reinforcement comprises needle-leaves-tree unbleached kraft pulp and/or needle-leaves-tree bleached kraft pulp and used newspaper,
the amount of the used newspaper is not less than 1% by mass and not more than 20% by mass of the whole woody reinforcement consisting of the used newspaper and the needle-leaves-tree unbleached kraft pulp and/or the needle-leaves-tree bleached kraft pulp, and
the fiber reinforced cement particles are obtained by grinding and/or milling a fiber reinforced cement product which is obtained by curing raw materials comprising a hydraulic inorganic material, a siliceous material and a woody reinforcement in an autoclave;
forming a green mat by forming the slurry;
press-molding the green mat; and
curing the press mat in an autoclave.

21. The process for manufacturing the fiber reinforced cement product according to claim 20, wherein
the hydraulic inorganic material is Portland cement,
the siliceous material is pearlstone and/or fly ash.

* * * * *